United States Patent [19]

Kent et al.

[11] Patent Number: 4,834,959
[45] Date of Patent: May 30, 1989

[54] PROCESS FOR SELECTIVELY REMOVING SULFUR DIOXIDE

[75] Inventors: Van Albert Kent; Larry H. Kirby; William R. Behr, all of Lake Jackson, Tex.

[73] Assignee: The Dow Chemical Company, Midland, Mich.

[21] Appl. No.: 905,426

[22] Filed: Sep. 10, 1986

Related U.S. Application Data

[63] Continuation-in-part of Ser. No. 837,936, Mar. 10, 1986, abandoned.

[51] Int. Cl.⁴ .............................................. C01B 17/00
[52] U.S. Cl. .................................................. 423/242
[58] Field of Search ........................... 423/242 A, 242

[56] References Cited

U.S. PATENT DOCUMENTS

| | | | |
|---|---|---|---|
| 3,790,660 | 2/1974 | Earl et al. | 423/242 |
| 3,971,844 | 7/1976 | Schneider | 423/182 |
| 4,170,628 | 10/1979 | Kosseim et al. | 423/242 A |
| 4,201,755 | 5/1980 | Nofal | 423/242 A |

Primary Examiner—John Doll
Assistant Examiner—Lori S. Freeman
Attorney, Agent, or Firm—B. G. Colley

[57] ABSTRACT

Gas feed streams containing sulfur dioxide such as flue gas streams are first contacted with an aqueous solution of inorganic sulfites and bisulfites having a pH range from about 2 to about 6.5 to remove a minor amount of sulfur dioxide. The same gas stream is then contact with a second aqueous solution of sulfites and bisulfites having a pH range from about 7.0 to about 12.5. Alkali metal hydroxide or ammonium hydroxide solution is added to the liquid inlet of the second contactor and the solution of the second contactor is pumped to the liquid inlet of the first contactor.

11 Claims, 1 Drawing Sheet

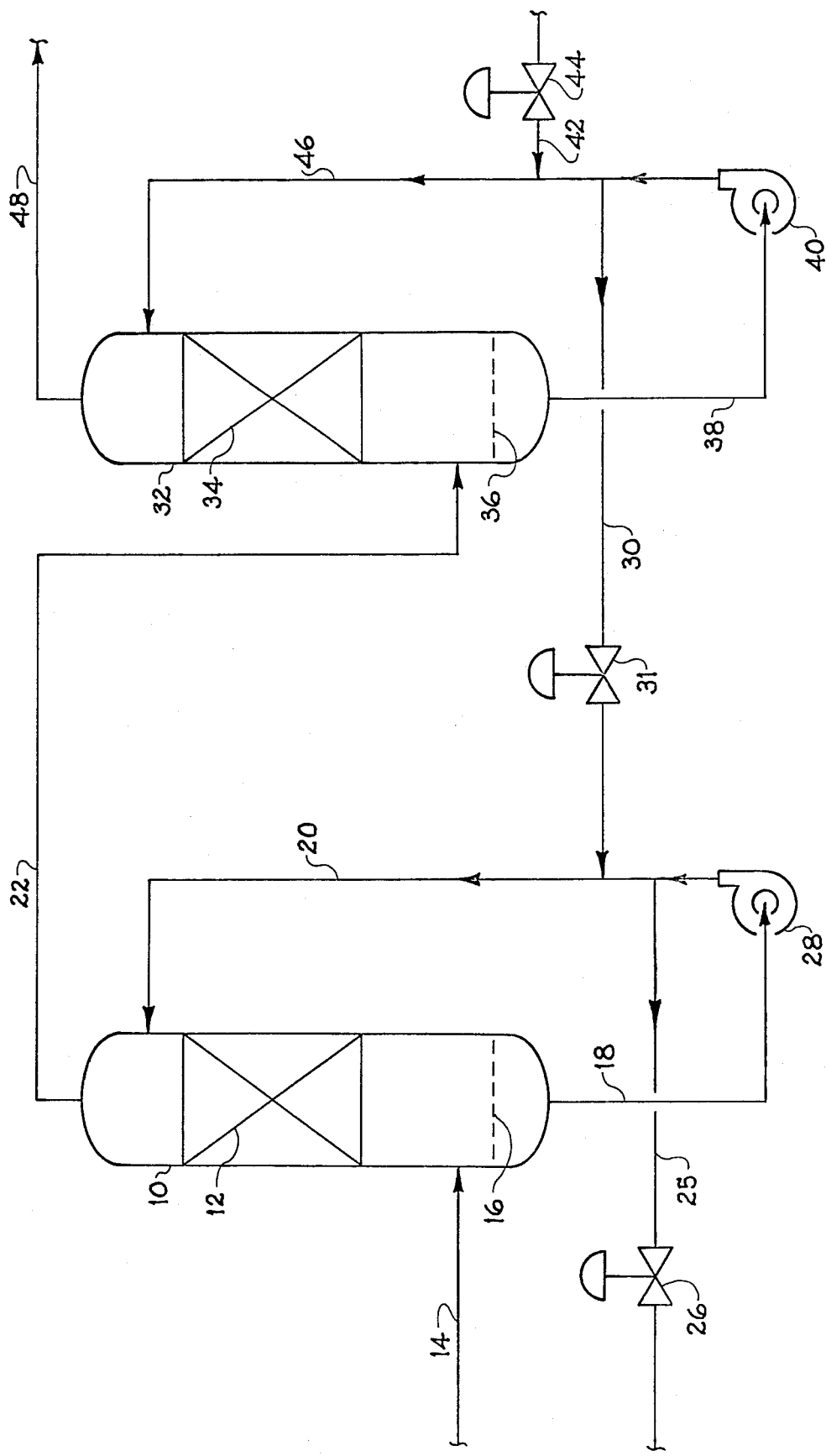

PROCESS FOR SELECTIVELY REMOVING SULFUR DIOXIDE

CROSS REFERENCE TO RELATED APPLICATIONS

This application is a continuation-in-part of Ser. No. 837,936 filed Mar. 10, 1986 now abandoned.

BACKGROUND OF THE INVENTION

This invention relates to a process wherein sufluf dioxide ($SO_2$) is selectively removed in a minimum of two stages of gas-liquid scrubbing from gas streams containing $SO_2$ and $CO_2$ with little or no $CO_2$ removal.

The removal of $SO_2$ from gases containing it and the use of alkali salt solutions for adsorption is generally known from "Gas Purification" by Kohl and Risenfeld (Third Edition 1979) Chapter 7.

The absorption of $SO_2$ from flue gas using two zones of gas-liquid contact with alkaline solutions is disclosed in U.S. Pat. No. 4,201,755. However, the present invention makes more efficient use of the alkaline solution and provides for the removal of $SO_2$ with little or no $CO_2$ absorption.

SUMMARY OF THE INVENTION

The present invention is directed to a process for selectively removing $SO_2$ from gas streams containing $SO_2$ with carbon dioxide ($CO_2$) with or without oxygen. The process can be used on flue gas streams from power plants, tail gas streams from sulfuric acid plants, paper mill stack gases, and stack gas from metal smelters such as copper, zinc, and lead smelters.

This invention is directed to a process for selectively removing $SO_2$ from a gas feed stream containing $SO_2$ and $CO_2$ with or without $O_2$ which comprises the steps of (A) contacting said gas stream in a first counter-current contactor zone with a first aqueous solution of a mixture of sulfites and bisulfites having a cation selected from the group consisting of alkali metal ions, and ammonium ions and having a pH in the range from about 2 to about 6.5 whereby a minor amount of said $SO_2$ is removed, a gas stream of lowered $SO_2$ content is generated, and a solution having an excess of bisulfite ions is generated, (B) removing a portion of said generated solution as needed to maintain proper liquid levels in said contact zones, (C) separating said generated gas stream, and (D) contacting said generated gas stream in a second counter-current contactor zone with a second aqueous solution of said sulfites and bisulfites having a pH maintained in the range from about 7.0 to about 12.5, wherein the improvement comprises adding fresh caustic solution to the liquid inlet of said second contactor zone and said second solution is recycled to the liquid inlet of said first contactor zone.

It is to be understood that the first stage of the process i.e. the contacting of the gaseous feed stream with an aqueous solution of sulfite and bisulfites can also be called a bisulfite generation step. The second step of the process i.e. the contacting of the gas stream having a lowered $SO_2$ content can be called a scrubbing step since a large amount and/or the remainder of the $SO_2$ is removed in the scrubbing step. It is contemplated that if further removal of $SO_2$ is desired, one can use a generation step followed by two scrubbing steps in series. Alternatively, one can use two generation steps followed by one scrubbing step all in series.

BRIEF DESCRIPTION OF THE DRAWING

The FIGURE of the drawing illustrates a process wherein the invention is applied to a gas stream containing $SO_2$ and $CO_2$ using two contactors having internal packing.

The inlet line 14 allows the feed gas to enter the first contactor 10 at point between the packing material 12 and the liquid level 16.

An aqueous solution of alkali metal, or ammonium sulfites and bisulfites flows into the contactor 10 at the upper part thereof by means of line 20. This solution flows downwardly through the contact elements or packing material 12 where it is countercurrently contacted by the inlet gases from line 14. A minor amount such as 5 to 45% preferably 30 to 40% of $SO_2$ in the gas stream is converted to bisulfite ions by the reaction of the $SO_2$ with water and the sulfite ions. The liquid level 16 in the bottom of the contactor 10 is maintained at a substantially constant level by a liquid level controller (not shown) which connected to valve 26.

Thus, a portion of the excess bisulfite solution is withdrawn as a by-product by line 25 whenever the liquid level 16 exceed a predetermined level or height.

Pump 28 and line 18 provide a constant recirculation of the sulfite-bisulfite solution back to the contactor 10 by means of line 20.

A partially purified gas stream is removed from the top of contactor 10 by line 22 and this gas stream is fed to the second contactor 32 at a point between the contact elements or packing material 34 and liquid level 36. In the second contactor 32 the gas fed by line 22 is contacted with a sulfite-bisulfite solution having a higher pH than the solution in line 20. This is made possible by the fact that an aqueous alkali metal hydroxide such as sodium hydroxide solution having a concentration of up to 40 weight percent sodium hydroxide is added by line 42 with the amount added being controlled by valve 44. Valve 44 is controlled by the pH in either line 30 or line 25. The actual amount of and concentration of sodium hydroxide is determined by the amount of $SO_2$ in the feed stream.

The sodium hydroxide converts the bisulfite ions to sulfite ions by a well known reaction in line 46. Hence, any carbon dioxide ($CO_2$) gas in the feed stream never contacts sodium hydroxide and it is not converted to a carbonate salt.

Pump 40 and line 38 are provided to recirculate the bisulfate-sulfite solution back to the contactor 32 and to recirculate the solution to the first contactor 10 by means of line 30, control valve 31, and line 20.

The purified gas is removed from the top of the contactor 32 by line 48.

DETAILED DESCRIPTION OF THE INVENTION

While the process of this invention is useful to treat any gas stream containing $SO_2$ gas, it is particularly useful to treat flue gas streams containing about 0.001 to about 50 percent by volume $SO_2$ about 1.0 to 90 percent by volume $CO_2$ and a small amount of oxygen such as 0.1 to 6 percent by volume.

The process is conducted at a temperature range from about 5° to 95° C. and preferably in the range gfrom 20° to 40° C.

The pressure range for the contactors is generally from about 1 to 70 atmospheres and preferably 1 to 10 atmospheres.

The packing for the gas-liquid contactors can be the conventional internal packing types such as, Pall rings, Beryl saddles and Raschig rings. Also useful are spray towers, tray towers and inline static mixing elements.

In general, the contact time of the liquid and gas should be in the range from about 0.01 to about 60 seconds and preferably in the range from 0.03 to 1 second.

While the foregoing describes the use of alkali metal hydroxides in this process it is to be understood that the invention is not limited solely to the use of such hydroxides. Line 42 can also be used to supply ammonium hydroxide or ammonia if it desired or more economical since the ammonium ion functions as well as the alkali metal ions. In this instance, the second contactor 32 will be provided with a spraying device and ammonia scrubbing water (not shown) in the upper parts thereof to remove ammonia gas from the purified gas leaving the contactor 32 by line 48.

Detailed examples are given below for the purpose of further illustrating but not limiting the invention.

EXAMPLE 1

A simulated flue gas stream (21 cubic feet per minute) containing 500 ppm of $SO_2$ with oxygen, nitrogen, and $CO_2$ gases was contacted with a sodium bisulfite-sodium sulfite solution using the process illustrated in the FIGURE of the drawing. The solution in each contactor was circulated at a rate of 0.5 gallons per minute.

The pH of the first contactor was maintained at 4.4 and the second contactor was maintained at 8.9 by a constant addition of an aqueous sodium hydroxide solution. This resulted in an outlet gas containing a reduced amount of $SO_2$ and all the original $CO_2$ gas. The sodium hydroxide consumption was 1.63 moles per mole of sulfur removed.

CONTROL

The procedure of Example 1 was repeated except that the caustic was added directly into the bulk solution of the second contactor and the recycle stream from the second contactor went directly into the bulk solution of the first contactor. This is designed to duplicate the process set forth in U.S. Pat. No. 4,201,755. The results are set forth in the table set forth below.

EXAMPLE 2

The procedures of example 1 were repeated. The results are set forth in the table.

TABLE

| Run | I pH* | II pH** | NaOH Consumption*** |
|---|---|---|---|
| Ex 1 | 4.4 | 8.9 | 1.63 |
| Ex 2 | 4.4 | 8.9 | 1.62 |
| Control | 5.2 | 8.9 | 1.80 |

*pH in first contactor
**pH in second contactor
***moles of the NaOH consumed per mole of sulfur removed From the data presented, it is apparent that the addition of caustic of the liquid inlet of the second contactor and the recycle of the second solution to the liquid inlet of the first contactor results in a considerable reduction (10%) in the amount of sodium hydroxide consumed.

We claim:

1. In a process for selectively removing $SO_2$ from a gas feed stream containing $SO_2$ and $CO_2$ with or without $O_2$ which comprises the steps of
    (A) contacting said gas stream in a first counter-current contactor zone with a first aqueous solution of a mixture of sulfites and bisulfites having a cation selected from the group consisting of alkali metal ions, and ammonium ions and having a pH in the range from about 2 to about 6.5 whereby a minor amount of said $SO_2$ is removed, a gas stream of lowered $SO_2$ content is generated, and a solution having an excess of bisulfate ions is generated,
    (B) removing a portion of said generated solution as needed to maintain proper liquid levels in said contact zones,
    (C) separating said generated gas stream, and
    (D) contacting said generated gas stream in a second counter-current contactor zone with a second aqueous solution of said sulfites and bisulfites having a pH maintained in the range from about 7.0 to about 12.5, the improvement which comprises adding alkali metal hydroxide, ammonium hydroxide or ammonia to the liquid inlet of said second contactor zone and said second solution is recycled to the liquid inlet of said first contactor zone.

2. The process of claim 1 wherein steps (A) and (D) are conducted at a temperature range from about 5° to 95° C. using liquid-vapor contactors, and a contact time ranging from 0.01 to 60 seconds.

3. The process of claim 1 wherein step (A) is conducted at a pH range from about 4.0 to about 5.0 and step (D) is conducted at a pH range from about 8.5 to about 9.5.

4. In a process for selectively removing $SO_2$ from a gas feed stream containing $SO_2$ and $CO_2$ with or without $O_2$ which comprises the steps of
    (A) contacting said gas stream in a first counter-current contactor zone with a first aqueous solution of a mixture of alkali metal sulfites and bisulfites and having a pH in the range from about 2 to about 6.5 whereby a minor amount of said $SO_2$ is removed, a gas stream of lowered $SO_2$ content is generated, and a solution having an excess of bisulfite ions is generated,
    (B) removing a portion of said generated solution as needed to maintain proper liquid levels in said contact zones,
    (C) separating said generated gas stream, and
    (D) contacting said generated gas stream in a second counter-current contactor zone with a second aqueous solution of a mixture of an alkali metal sulfite and an alkali metal bisulfate having a pH maintained in the range from about 7.0 to about 12.5, the improvement which comprises adding alkali metal hydroxide solution to the liquid inlet of said second contactor zone and said second solution is recycled to the liquid inlet of said first contactor zone.

5. The process as set forth in claim 4 wherein the amount of $SO_2$ in said feed stream ranges from about 0.001 to about 25 percent by volume, the amount of $CO_2$ in said feed stream ranges from about 1.0 to about 90 percent by volume, and the amount of oxygen in said feed stream range from about 0 to about 20 percent by volume.

6. The process of claim 4 wherein steps (A) and (D) are conducted at a temperature range from about 5° to 95° C. using liquid-vapor contactors, and a contact time ranging from 0.01 to 60 seconds.

7. The process of claim 4 wherein step (A) is conducted at a pH range from about 4.0 to about 5.0 and step (D) is conducted at a pH range from about 8.5 to about 9.5.

8. In a process for selectively removing $SO_2$ from a flue gas feed stream containing $SO_2$ and $CO_2$ which comprises the steps of (A) contacting said flue gas stream in a first counter-current contact or zone with a first aqueous solution of a mixture of an alkali metal sulfite and an alkali metal bisulfite having a pH in the range from about 2 to about 6.5 whereby a minor amount of said $SO_2$ is removed, a gas stream of lowered $SO_2$ content is generated, and an alkali metal solution having an excess of bisulfite ions is generated, (B) removing a portion of said generated solution as needed, to maintain proper liquid levels in said contact zones, (C) continuously recirculating the remainder of said generated solution to said first aqueous solution, (D) separating said generated gas stream, (E) contacting said generated gas stream in a second counter-current contactor zone with a second aqueous solution of a mixture of an alkali metal sulfite and an alkali metal bisulfite having a pH maintained in the range from about 7.0 to about 12.5 by the addition of a suitable hydroxide compound and whereby a substantially purified gas stream is generated, and a second solution is generated, (F) separating said purified gas stream from said first solution, and (G) continuously recycling said first solution to said first contacting step, the improvement which comprises adding alkali metal hydroxide solution to the liquid inlet of said second contactor zone and said second solution is recycled to the liquid inlet of said first contactor zone.

9. The process as set forth in claim 8 wherein the amount of $SO_2$ in said feed stream ranges from about 0.001 to about 25 percent by volume, the amount of $CO_2$ in said feed stream ranges from about 1.0 to about 90 percent by volume, and the amount of oxygen in said feed stream ranges from about 0 to about 20 percent by volume.

10. The process of claim 8 wherein steps (A) and (E) are conducted at at temperature range from about 5° to 95° C. using liquid-vapor contactors, and a contact time ranging from 0.01 to 60 seconds.

11. The process of claim 8 wherein step (A) is conducted at a pH range from about 4 to 5 and step (E) is conducted at a pH range from about 8.5 to about 9.5.

* * * * *